United States Patent Office 3,116,829
Patented Jan. 7, 1964

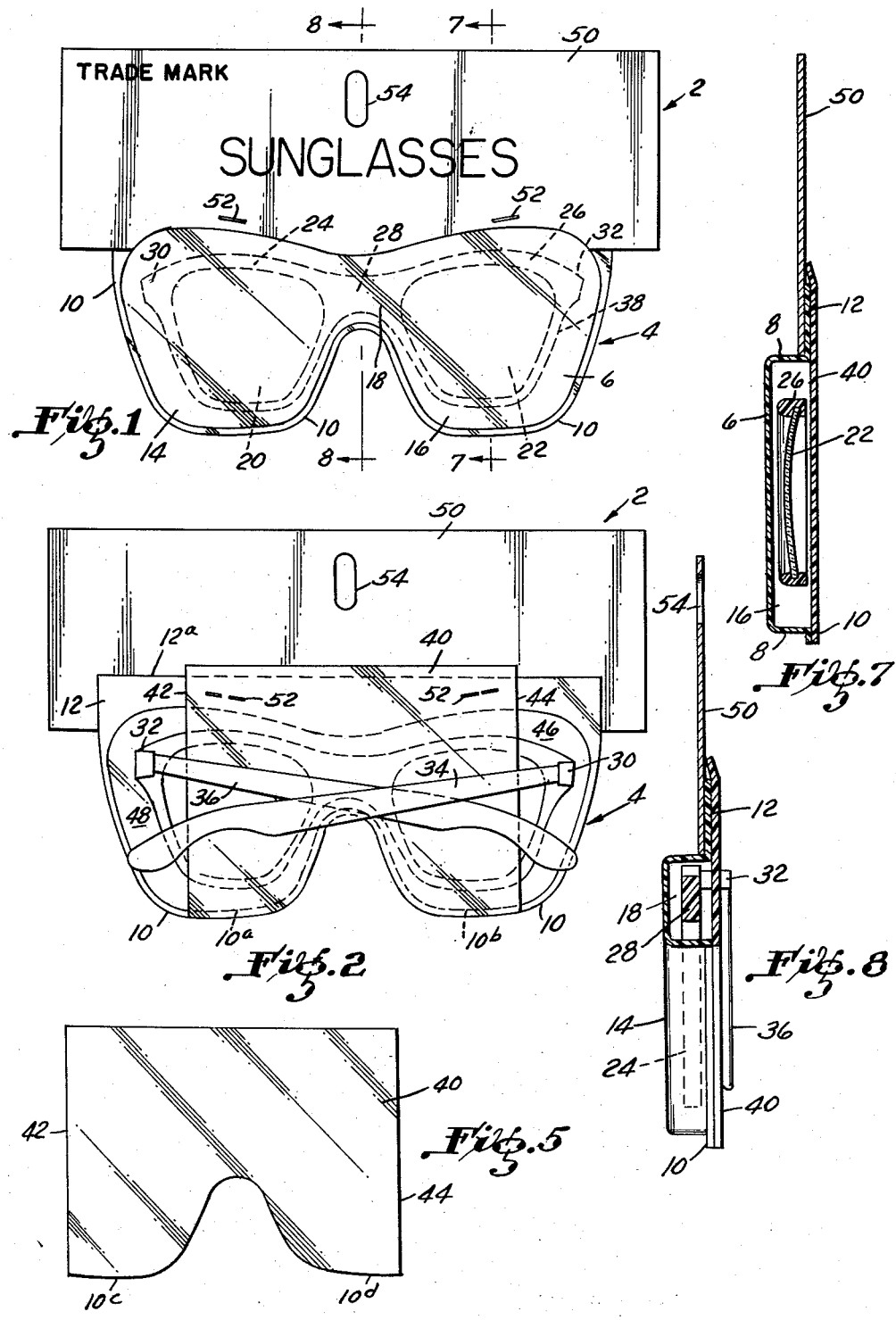

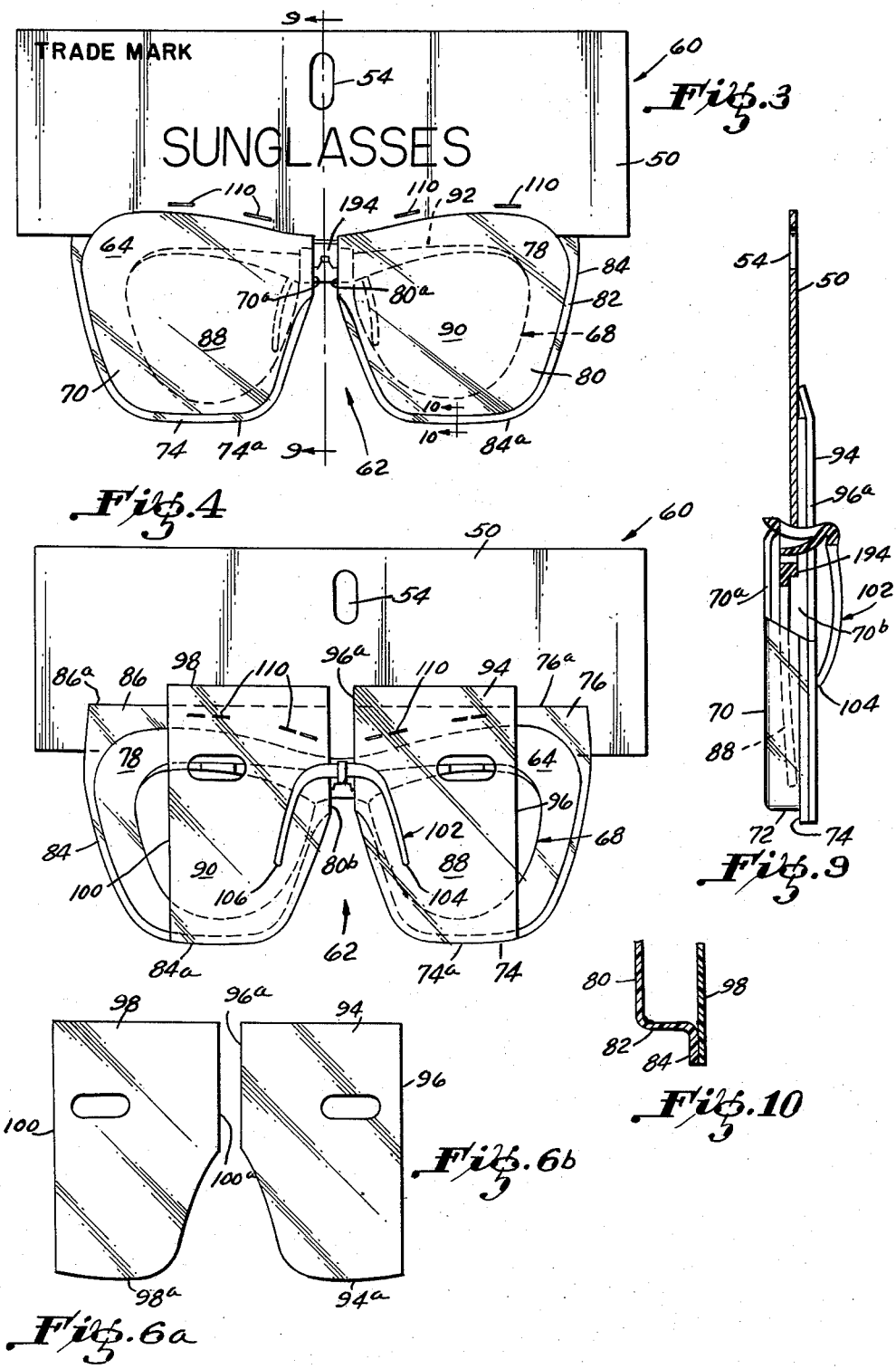

3,116,829
PILFER-PROOF DISPLAY PACKAGE FOR
SUNGLASSES
William G. Pacelli, Leominster, Mass., assignor to Foster
Grant Co., Inc., Leominster, Mass., a corporation of
Delaware
Filed Sept. 12, 1960, Ser. No. 55,476
5 Claims. (Cl. 206—78)

This invention relates to pilfer-proof display packages for sunglasses adapted to enable a prospective purchaser to test-fit the sunglasses prior to purchase of same without removing the sunglasses from the package thereby greatly reducing the likelihood of removal of the sunglasses from the package and improper taking thereof by a prospective purchaser.

In present day merchandising practice, self-service supermarket type stores have replaced the former neighborhood type stores, and such supermarket stores are such that customers select their merchandise and pay for same at a check-out or cashier's stand. In such supermarkets, the type of goods which one can purchase is quite varied and includes foodstuffs, clothing and such items as sunglasses. The problem of pilferage of such relatively small and easily-taken items as sunglasses has become acute for the reason that a pair of sunglasses can be easily removed from the ordinary well-known types of open-shelf display stands and improperly taken by one going through such a supermarket. Also, such gayly colored items as novelty sunglasses are quite attractive to youngsters accompanying their parent on a shopping tour through such a store, and, without the knowledge of the parent, the youngster can easily remove a pair of sunglasses from the open-shelf display stand and leave the store with said sunglasses without even the parent being aware of this. In addition, in many cases, even where open-shelf display stands are utilized, the sunglasses are in an easily opened package which does not deter one from opening the package, removing the pair of sunglasses therefrom, and walking out of the store with the sunglasses on his face. To accost an individual and question him as to whether he has paid for the sunglasses results in innumerable legal difficulties for the store operators, as is quite apparent.

Also, the problem of properly and economically packaging such items as novelty sunglasses is directly related to the problem of properly and economically displaying same in a manner pleasingly appearing to the purchasing public in a merchandising outlet such as is a supermarket. Said two problems are here solved with my invention in such a manner that the package for such item as novelty sunglasses is such that the sunglasses can be easily seen and examined and test-fitted on the face by the prospective purchaser without removal of said pair of sunglasses therefrom and that the prospective purchaser is at all times made aware of the source of origin, viz. the manufacturer, of said pair of sunglasses, and the latter even while he is test-fitting same on his face, as by viewing himself in a mirror with said sunglasses positioned on his face. The pilfer-proof display package of this invention comprises, in combination, transparent receptacle means for receiving at least the combination of the lenses and their respective frame member holding portions. This transparent receptacle means has substantially the configuration of at least a portion of the combination of the sunglass lenses and their respective frame member holding portions. Associated with at least a portion of said receptacle means is transparent means for retaining said combination in said receptacle means, and said transparent means is so associated at at least a portion thereof. Attached to and in combination with preferably said transparent receptacle means and said transparent retaining means is a means for describing and indicating the source of origin, viz. the manufacturer, of the pair of sunglasses, and said latter means is so attached that it is out of, and preferably above, the line of vision of the prospective purchaser of said sunglasses. Said latter means is preferably a sheet of paper, for example, preferably of at least the overall length and overall width of said receptacle means, having imprinted thereon the word "sunglasses" thereacross and the manufacturer's trademark in the upper left hand corner thereof. Also, through the upper mid-portion thereof is an opening for enabling the pilfer-proof display package to be suspended on a display rack. Further, the package is of such construction that the temple means, or the clips, as the case may be, of the sunglasses extend outside of said combination thereby enabling the prospective purchaser to try on or test-fit the sunglasses without removing same therefrom. Thusly, when one test-fits said pilfer-proof display package, he has on his face the transparent combination of said receptacle means and said retainer means, both of which are transparent, thereby enabling the viewing of himself in the mirror, and also, across his forehead, the said printed card. Because of the transparency of said aforedescribed combination the prospective purchaser is then able to try on said sunglasses to determine whether same are proper with respect to his facial features and whether the tinting of said lenses are to his liking, among other things. Also, in view of the fact that said printed sheet appears across his face, preferably, the forehead portion thereof, the prospective purchaser will hesitate to attempt to remove the sunglasses from said package, especially after having test-fitted same. Likewise, a child with his parent will be immediately noticed and observed in handling such a package. Thusly, will the likelihood of removal of the sunglasses from and the improper and inadvertent taking of same by a child or a prospective purchaser be greatly reduced.

An object of this invention is to provide a pilfer-proof display package for sunglasses for enabling a prospective purchaser to test-fit said sunglasses without removing the sunglasses therefrom and for preventing unnecessary handling of said sunglasses by children thereby greatly reducing the likelihood of removal from said package and improper taking of said sunglasses.

Other objects and features of this invention will become readily apparent from the following detailed description which is not limiting but only illustrative of the preferred embodiments of this invention.

FIGURE 1 is a front elevational view of one embodiment of my invention.

FIGURE 2 is a rear elevational view of the embodiment of FIGURE 1.

FIGURE 3 is a front elevational view of another embodiment of my invention.

FIGURE 4 is a rear elevational view of the embodiment of FIGURE 3.

FIGURE 5 is an elevational view of a component part of the embodiment of FIGURE 1.

FIGURE 6a is an elevational view of a component part of the embodiment of FIGURE 3.

FIGURE 6b is an elevational view of the embodiment of FIGURE 3.

FIGURE 7 is a cross-sectional view on the line 7—7 of FIGURE 1.

FIGURE 8 is a cross-sectional view on the line 8—8 of FIGURE 1.

FIGURE 9 is a cross-sectional view on the line 9—9 of FIGURE 3.

FIGURE 10 is a cross-sectional view on the line 10—10 of FIGURE 3.

More specifically, referring to FIGURES 1, 2, 5, 7 and 8, the pilfer-proof display package 2 comprises a shaped or molded receptacle 4 including bottom wall 6 and side wall 8 preferably extending therearound. Extending from and integral with side wall 8 is the flange 10, which, as is clearly shown in the appended drawings, extends preferably about the greater portion of said side wall 8. Also integral with side wall 8 and extending therefrom at the top portion thereof is flange 12. Said receptacle 8 comprises the two receiving chambers 14 and 16 and the connecting portion 18, said receptacle including said portions 14, 16 and 18 having the configuration of the sunglass lenses 20, 22 and their respective frame member holding portions 24, 26 connected by nose rest frame portion 28. Hingedly attached to said frame member holder portions 24, 26 at their respective upper end portions 30 and 32 are temple members 34 and 36. Positioned within receptacle 4, in the receiving chambers 14 and 16 and in the connecting portion 18 thereof are the frame member holding portions 24, 26 and the connecting nose rest 28 of the sunglass frame 38. Positioned against said receptacle 4 at the bottom portions 10a, 10b of flange 10 and flange 12 is retaining member 40, said retaining member preferably having the configuration of a portion of receiving chambers 14 and 16 and the connecting passage 18. However, as is clearly shown in the appended drawings, retaining member 40 terminates at edges 42 and 44, short of the respective portions of the side wall 8 of receptacle 4, thereby forming the spaces or openings 46 and 48 through which extend temple members 34 and 36, thereby making it possible for a prospective purchaser to manipulate said temples in test-fitting the sunglasses without removing them from the package after assembly thereof. Said retaining member 40 is preferably secured to flange 10, at the bottom portions 10a and 10b thereof by, for example, adhesive means or heat sealing and also to flange 12 and to card 50, of, for example, cardboard or other fibrous material or other sheet material on which descriptive material such as the word "sunglasses" and the trademark and other printed matter can be placed, as, for example, by printing. Said retaining member 40, flange 12 and card 50 are preferably attached by securing means such as, for example, staples 52, 52, as clearly shown in the appended drawing. Through the upper central portion of card 50 is opening 54 for receiving therethrough a rod rack member of a display stand (not shown) from which said package 2 hangs in display. In test-fitting the sunglasses, one need only remove said package containing same and manipulate the exposed temple members 34 and 36 to position said so-packaged sunglasses on his face and, of course, said package is merely removed from the display stand.

Referring to FIGURES 3, 4, 6a, 6b, 9 and 10, pilfer-proof display package 60 comprises hollow housing or receptacle means 62 which includes shaped hollow members 64 and 78. Display package 60, as clearly shown in the appended drawings, is adapted to contain sunglasses worn in combination with corrective eyeglasses and positioned thereover by clip-on means. Such clip-on sunglasses here designated by the numeral 68 is of the type disclosed in U.S. Patent No. 2,737,848. Hollow member 64 includes bottom wall 70 and side wall 72 preferably extending therearound. Extending from and integral with side wall 72 is flange 74, which, as is clearly shown in the appended drawings, extends preferably about the greater portion of said side wall 72. Also integral with side wall 72 and extending therefrom at the top portion thereof is flange 76. Hollow member 78 includes bottom wall 80 and side wall 82 preferably extending therearound. Extending from and integral with side wall 82 is flange 84, which, as is clearly shown in the appended drawings, extends preferably about the greater portion of said side wall 82. Also integral with side wall 82 and extending therefrom at the top portion thereof is flange 86. Said hollow members 64 and 78 each have the configuration of the sunglass lens 88 and of the lens 90 and portions of their respective frame or frontal member 92, as clearly shown in the appended drawings. The nose rest portion 194 of said member 92 is not within either hollow member 64 or 78, as clearly shown in the appended drawings. As is further clearly shown in the appended drawings, lens member 88 and lens member 90 and their respective holding portions of said member 92 are positioned within the respective hollow members 64 and 78. Positioned against hollow member 64 at the bottom porton 74a of flange 74 and against flange 76, at a portion thereof, is retaining member 94, said retaining member preferably having the configuration of a portion of hollow member 64. However, as is clearly shown in the appended drawings, retaining member 94 terminates at edge 96, short of the side wall 72, and at the edge 96a. Positioned against hollow member 78 at the bottom portion 84a of flange 84 and against flange 86, at a portion thereof, is retaining member 98, said retaining member having the configuration of a portion of hollow member 78. However, as is clearly shown in the appended drawings, retaining member 98 terminates at edge 100, short of side wall 82 and at the edge 100a. The clip member 102, at its end portions 104 and 106, rests on said retaining members 94 and 98, respectively, as clearly shown in the appended drawings. Said retaining member 94 is preferably secured to flange 74 at bottom portion 74a thereof by, for example, adhesive means or heat sealing, and to flange 76 and to card 50. Said retaining member 98 is preferably secured to flange 84 at bottom portion 84a thereof by, for example, adhesive means or heat sealing, and to flange 86 and to card 50. Said retaining members 94 and 98, said flanges 76 and 86, and card 50 are preferably attached by securing means such as, for example, staples 110, 110, 110, 110, as clearly shown in the appended drawing. In test-fitting the clip-on sunglasses, one need only remove said package containing same from the display stand and manipulate said clip member 102 to fit over the wearer's corrective eyeglasses at the nose portion thereof. As is clearly shown in the appended drawings, edge 96a of retaining member 94 is spaced from edge 70a of bottom wall 70 of hollow member 64 to form opening 70b therebetween, and edge 100a of retaining member 98 is spaced from edge 80a of bottom wall 80 of hollow member 78 to form opening 80b therebetween. As is clearly shown in the appended drawings, the nose rest portion 194 of member 92 is positioned outside of hollow members 64 and 78.

As is clearly apparent, the retaining member 40 can be made integral with flange 12 at edge 12a, and the retaining members 94 and 98 can be made integral with flange 86 at edge 86a, thereby enabling retaining member 40 to be folded to hold the sunglasses in receptacle 4. Likewise, should it be desired, edges 10c and 10d of retaining member 40 can, instead, be made integral with receptacle 40 at bottom portions 10a and 10b of flange 10, likewise enabling retaining member 40 to be folded to hold the sunglasses in receptacle 4. Similarly, the retaining members 94 and 98 can be made integral with receptacles 64 and 78, respectively at edges 76a and 86a of flanges 76 and 86, respectively, or at edges 94a and 98a with edges 74a and 84a of flanges 74 and 84, respectively, and similarly folded to retain the sunglasses within the respective receptacles 64 and 78.

The receptacle 4 and the retaining member 40, and the shaped hollow members 64 and 78 and the retaining members 94 and 98 are preferably formed from transparent thermoplastic organic sheet material such as cellulose acetate or polystyrene, among others, having a substantially small thickness such as 1/64" or 1/32". Also contemplated to be within the scope of this invention is the utilization of transparent sheet film of thermoplastic organic materials having a thickness of as small as 0.001".

While there is hereinabove described and illustrated preferred embodiments of this invention, it is to be understood that many modifications and changes may be made

I claim:

1. A pilfer-proof sunglass display package enabling a prospective purchaser to test-fit the sunglasses and visualize his appearance without removing said sunglasses therefrom, comprising, in combination, hollow transparent means housing the combination of the lenses and their respective frame member holding portions, said means being substantially in the shape of at least said combination of the lenses and their respective frame member holding portions, transparent means retaining said combination in said housing means, said retaining means being substantially fixedly associated, for at least a portion thereof, with at least a portion of said housing means, means positioning and maintaining said sunglasses while in said package on said prospective purchaser in his line of vision, and means describing and indicating the source of said sunglasses and displaying said sunglasses, said latter means being secured to at least one of said housing means and said retaining means, whereby a prospective purchaser may test-fit the sunglasses without removal of same from said package and the likelihood of removal from said package and improper taking of said sunglasses by a prospective purchaser is greatly reduced.

2. A pilfer-proof sunglass display package enabling a prospective purchaser to test-fit the sunglasses and visualize his appearance without removing said sunglasses therefrom, comprising, in combination, hollow transparent means housing the combination of the lenses and their respective frame member holding portions, said means being substantially in the shape of at least said combination of the lenses and their respective frame member holding portions, transparent means retaining said combination in said housing means, said retaining means being substantially fixedly associated, for at least a portion thereof, with at least a portion of said housing means, means positioning and maintaining said sunglasses while in said package on said prospective purchaser in his line of vision, means allowing said positioning and maintaining means to be manipulated outside of said package, and means describing and indicating the source of said sunglasses and displaying said sunglasses, said latter means being secured to at least one of said housing means and said retaining means, whereby a prospective purchaser may test-fit the sunglasses without removal of same from said package and the likelihood of removal from said package and improper taking of said sunglasses by a prospective purchaser is greatly reduced.

3. A pilfer-proof sunglass display package enabling a prospective purchaser to test-fit the sunglasses and visualize his appearance without removing said sunglasses therefrom, comprising, in combination, hollow transparent means housing the combination of the lenses and their respective frame member holding portions, said means being substantially in the shape of at least said combination of the lenses and their respective frame member holding portions, transparent means retaining said combination in said housing means, said retaining means being substantially fixedly associated, for at least a portion thereof, with at least a portion of said housing means, means positioning and maintaining said sunglasses while in said package on said prospective purchaser in his line of vision, and means describing and indicating the source of said sunglasses and displaying said sunglasses, said latter means being secured to at least one of said housing means and said retaining means and being positioned out of vision of the wearer of said so-packaged sunglasses, whereby a prospective purchaser may test-fit the sunglasses without removal of same from said package and the likelihood of removal from said package and improper taking of said sunglasses by a prospective purchaser is greatly reduced.

4. A pilfer-proof sunglass display package enabling a prospective purchaser to test-fit the sunglasses and visualize his appearance without removing said sunglasses therefrom, comprising, in combination, hollow transparent means housing the combination of the lenses and their respective frame member holding portions, said means being substantially in the shape of at least said combination of the lenses and their respective frame member holding portions, transparent sheet means retaining said combination in said housing means, said retaining means being substantially fixedly associated, for at least a portion thereof, with at least a portion of said housing means, means positioning and maintaining said sunglasses while in said package on said prospective purchaser in his line of vision, and means describing and indicating the source of said sunglasses and displaying said sunglasses, said latter means being secured to at least one of said housing means and said retaining means, whereby a prospective purchaser may test-fit the sunglasses without removal of same from said package and the likelihood of removal from said package and improper taking of said sunglasses by a prospective purchaser is greatly reduced.

5. A pilfer-proof sunglass display package enabling a prospective purchaser to test-fit the sunglasses and visualize his appearance without removing said sunglasses therefrom, comprising, in combination, hollow transparent means housing the combination of the lenses and their respective frame member holding portions, said means being substantially in the shape of at least said combination of the lenses and their respective frame member holding portions, transparent means retaining said combination in said housing means, said retaining means being substantially fixedly associated, for at least a portion thereof, with at least a portion of said housing means, means positioning and maintaining said sunglasses while in said package on said prospective purchaser in his line of vision, means allowing said positioning and maintaining means to be manipulated outside of said package, and card means describing and indicating the source of said sunglasses and displaying said sunglasses, said latter means being secured to at least one of said housing means and said retaining means, whereby a prospective purchaser may test-fit the sunglasses without removal of same from said package and the likelihood of removal from said package and improper taking of said sunglasses by a prospective purchaser is greatly reduced.

References Cited in the file of this patent

UNITED STATES PATENTS

| 2,166,110 | Baldanza | July 18, 1939 |
| 2,212,596 | Fuller | Aug. 27, 1940 |
| 2,461,792 | Weaver | Feb. 15, 1949 |
| 2,650,701 | Parsell | Sept. 1, 1953 |
| 2,720,305 | Foster | Oct. 11, 1955 |
| 2,747,760 | Jacobson | May 29, 1956 |
| 2,788,121 | Ayres | Apr. 9, 1957 |
| 2,816,666 | Nadel | Dec. 17, 1957 |
| 2,874,836 | Wertepny | Feb. 24, 1959 |
| 2,913,106 | Colgae | Nov. 17, 1959 |
| 2,918,959 | Block | Dec. 29, 1959 |